(No Model.)
W. H. HOOKER.
APPARATUS FOR EXTRACTING GREASE FROM WATER OF CONDENSATION FROM STEAM ENGINES.
No. 516,738. Patented Mar. 20, 1894.
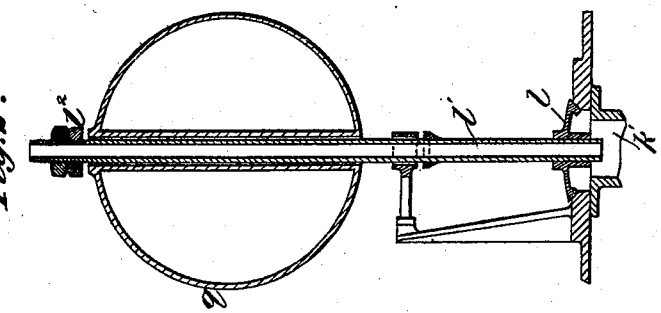
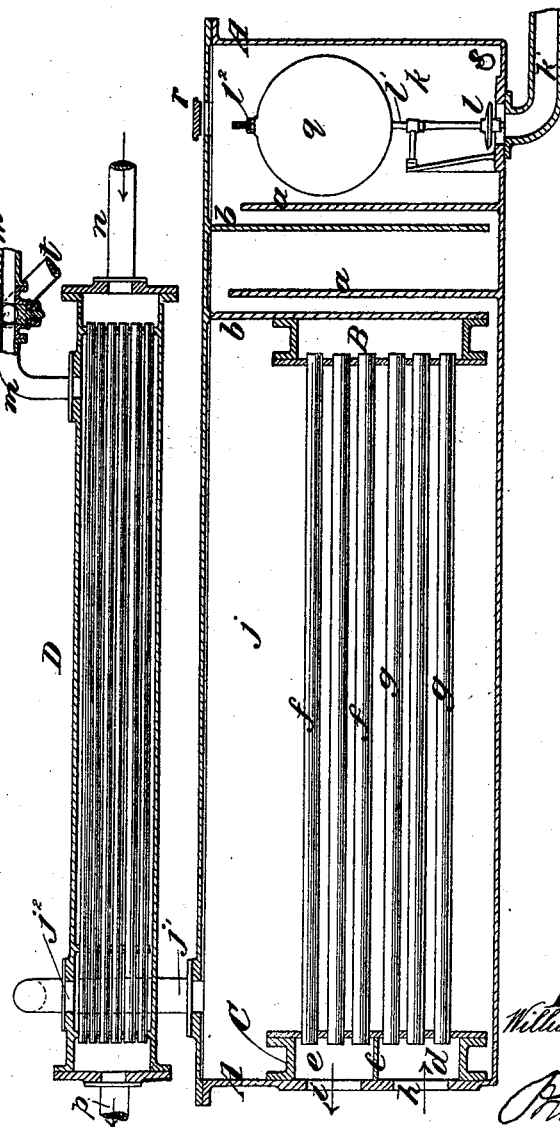
Witnesses:—
George Barry.
Robert Jacob Seward
Inventor:—
William H. Hooker.
by attorneys
Robert Seward

UNITED STATES PATENT OFFICE.

WILLIAM H. HOOKER, OF JERSEY CITY, NEW JERSEY.

APPARATUS FOR EXTRACTING GREASE FROM WATER OF CONDENSATION FROM STEAM-ENGINES.

SPECIFICATION forming part of Letters Patent No. 516,738, dated March 20, 1894.

Application filed June 1, 1893. Serial No. 476,291. (No model.)

*To all whom it may concern:*

Be it known that I, WILLIAM H. HOOKER, of Jersey City, in the county of Hudson and State of New Jersey, have invented a new and useful Improvement in Apparatus for Extracting Grease from Water of Condensation from Steam-Engines, of which the following is a specification.

The object of this invention is to provide a more effective means of extracting grease from the water of condensation from condensing steam engines and to provide by the cooling of the water in the separating apparatus for the more complete extraction of the grease from such water while on the way from the air pump of the engine to the feed pump of the boiler.

The nature of the improvement will be described with reference to the accompanying drawings and its novelty set forth in the claim.

Figure 1 of the drawings represents a vertical section of an apparatus embodying my invention. Fig. 2 represents a vertical section on a larger scale than Fig. 1 of a valve employed in said apparatus.

Similar letters of reference designate corresponding parts in both figures.

A is a covered tank which may be termed the separating tank and in which are transverse partitions $a\ a$ extending from the bottom to within a short distance of the top and transverse partitions $b\ b$ extending from the top to within a short distance from the bottom. Of these partitions $a$ and $b$ there may be one or more of each, two of each being represented. These partitions divide the tank into two compartments $j$ and $k$ which are in communication through openings left under the partitions $b$ and above the partitions $a$. Near that end of the compartment $j$ which is farthest from the partitions $b\ b$ there is at the top an inlet pipe $j'$ for the water from which the grease is to be extracted, and in the bottom of the compartment $k$ there is an outlet pipe $k'$ for the purified water. This pipe $k'$ may be the suction pipe of the feed pump for feeding the boiler. At the connection of the said pipe $k'$ with the tank there is a float valve $l$ which remains open so long as there is a free supply of water to the separating tank and which will be presently further described.

At opposite ends of the compartment $j$ of the tank there are arranged two boxes B and C. The box B is connected water-tight with the partition $b$ which forms the end of said compartment. The box C is connected water-tight with the other end of said compartment $j$ of the tank A. The last mentioned box C is divided by a partition $c$ into two compartments $d$ and $e$. Between the boxes C C are tubes $f\ f$ and $g\ g$, the tubes $f$ forming communication between the box B and the upper compartment $e$ of the box C, and the tubes $g$ forming communication between the box B and the lower compartment $d$ of the box C. The lower compartment $d$ of the box C has an opening $h$ with which is to be connected a pipe for the admission of cooling water. The water so admitted circulates through the tubes $g$ into the box B and thence back through the tubes $f$ into the compartment $e$ of the box C, the said compartment $e$ having an outlet opening $i$. In the case of a steamship the water admitted at $h$ would be from the sea and the waste pipe from the opening $i$ would lead overboard. The boxes B C and tubes $fg$ constitute a multitubular cooler. The water entering the tank at $j'$ is caused to circulate in the compartment $j$ around and between the tubes $f\ g$ before it can escape from said compartment under the bottom of the partition $b$, and it is so cooled in the said compartment $j$ that the grease will very easily separate from it and float on the top of it to be collected in the upper part of said compartment. The separation will be nearly complete in the said compartment $j$ and the water escaping below the first of the partitions $b$ and thence over the first of the partitions $a$ will be nearly pure but between the said partition $a$ and the second partition $a$, a further separation of any remaining grease may be effected, what is so separated floating up to the top of the tank while the further purified water escapes under the second partition $b$ and over the second partition $a$ into the compartment $k$ of the tank whence it is taken through the pipe $k'$ for feeding the boiler or for other use.

In order to utilize as far as practicable the heat contained in the water of condensation delivered by the air pump heating the purified water before feeding the latter to the boiler and at the same time to partly cool the greasy water from the air pump before introducing it into the separating tank A, I have represented in the drawings a multitubular feed water heater D of well known construction into which the hot greasy water from the air pump enters by a pipe $m\ m'$ and into which the cooled and purified water taken by the feed pump through the pipe $k'$ is delivered at $n$ at the discharge pipe of the feed pump. The greasy water thus partly cooled by the purified feed water leaves the said heater D and enters the separating tank by the pipe $j'$ before described which has a connection at $j^2$ with the said heater while the heated purified feed water leaves the said heater by the pipe $p$ which is connected with the boiler.

In order to provide for keeping the valve $l$ closed until the water attains a certain level in the compartment $k$ of the tank, the float $q$ is fitted loosely to the valve stem and allowed a certain movement up and down thereon and the stem is provided above the float with a nut or collar $l^2$ adjustable to different heights. The valve will remain closed by its own weight until lifted by the float, but in order that it shall not, while the water in the compartment $k$ is at proper height, remain closed by atmospheric pressure in consequence of the suction of the feed pump, its stem is made hollow throughout and continued upward above the level of the top of the next partition $a$ of the tank so that the air in the upper part of the tank will be in free communication with the suction pipe $k'$.

The cover of the tank A does not, except for the purpose of washing out the grease as will be presently described, require to be air-tight, and may either be entirely removable or it may be provided with manholes or handholes to permit the removal of the grease from the upper part of the tank, most or all of the said grease adhering to the said cover, in a condition resembling solidified froth or cellular tissue, in which condition it can be easily removed from the cover from time to time on the removal of the cover which will not require to be very often. As the tank should not be air-tight but on the contrary should be open to the atmosphere when the apparatus is in operation, I have shown a handhole provided with a bonnet $r$ at the top of the compartment $k$, which bonnet is always left off when the apparatus is in operation. The handhole gives access to the adjustable collar $l^2$ on the float valve-stem, and its bonnet is only to be applied to produce an air-tight closure of the tank for the purpose of washing it out with water from the steam boiler which water would be introduced under the boiler-pressure through an opening $s$ at the bottom of the tank, the washing water passing out by the pipe $j'$. To provide for thus washing out the separating tank and the heater D in the apparatus illustrated and described I provide in the pipe $m$ a three-way valve E of any known or suitable kind from which a waste pipe $t$ leads overboard or to any waste place. When such washing out is to be performed this valve is turned to a position to close communication between the branch $m'$ of the pipe $m\ m'$ and the air pump and open the communication from the heater D through the branch $m$ to the waste pipe $t$, and the bonnet $r$ of the handhole is to be closed to make the tank water-tight.

What I claim as my invention is—

The combination of the tank having a cover in which is an opening to the atmosphere and having an inlet at one end for the water to be purified and an outlet at the other end for the purified water, of vertical partitions one or more extending from the bottom part of the way to the cover and one or more extending from the cover part of the way to the bottom of said tank and dividing said tank into inlet and outlet compartments, a multitubular cooler in the inlet compartment and a float-controlled valve at the said outlet, substantially as herein set forth.

WILLIAM H. HOOKER.

Witnesses:
FREDK. HAYNES,
F. B. DECKER.